US011581846B2

(12) United States Patent
de Fresart et al.

(10) Patent No.: US 11,581,846 B2
(45) Date of Patent: Feb. 14, 2023

(54) PHOTOVOLTAIC MODULE DEFLECTION LIMITER

(71) Applicant: ARRAY TECHNOLOGIES, INC., Albuquerque, NM (US)

(72) Inventors: Benjamin C. de Fresart, Albuquerque, NM (US); Nathan Schuknecht, Golden, CO (US); Jon Sharp, Fort Collins, CO (US)

(73) Assignee: ARRAY TECHNOLOGIES, INC., Albuquerque, NM (US)

( * ) Notice: Subject to any disclaimer, the term of this patent is extended or adjusted under 35 U.S.C. 154(b) by 0 days.

(21) Appl. No.: 17/561,093

(22) Filed: Dec. 23, 2021

(65) Prior Publication Data

US 2022/0200522 A1    Jun. 23, 2022

Related U.S. Application Data

(60) Provisional application No. 63/130,177, filed on Dec. 23, 2020.

(51) Int. Cl.
*H02S 30/10* (2014.01)
*H02S 20/30* (2014.01)

(52) U.S. Cl.
CPC .............. *H02S 30/10* (2014.12); *H02S 20/30* (2014.12)

(58) Field of Classification Search
CPC ................. H02S 30/10; H02S 20/30
See application file for complete search history.

(56) References Cited

U.S. PATENT DOCUMENTS

| 2017/0201432 | A1  | 7/2017  | Balakrishnan et al. |
| 2018/0254740 | A1* | 9/2018  | Corio ............... F16F 15/022 |
| 2020/0076360 | A1  | 3/2020  | Watson et al. |
| 2020/0382053 | A1* | 12/2020 | Wares ............... H02S 30/10 |

FOREIGN PATENT DOCUMENTS

| DE | 9420809 U1    | 2/1995  |
| EP | 2253773 A1    | 11/2010 |
| JP | 2011231477 A  | 11/2011 |
| WO | 2017138248 A1 | 8/2017  |
| WO | 2017154826 A1 | 9/2017  |
| WO | 2017210432 A1 | 12/2017 |

OTHER PUBLICATIONS

Invitation to Pay Additional Fees for International Application No. PCT/US2021/065106 mailed Apr. 26, 2022.
International Search Report and Written Opinion for International Application No. PCT/US2021/065106 dated Jun. 20, 2022.

* cited by examiner

*Primary Examiner* — Jayne L Mershon
(74) *Attorney, Agent, or Firm* — Maschoff Brennan

(57) ABSTRACT

A deflection pad may include a body including two peaks, and a recess in the body between the two peaks, the recess may be sized to accommodate a fastener such that when deployed, the fastener is below a height of the two peaks within the recess. The deflection pad may include arms projecting in a direction generally opposite the two peaks, the arms biased inward towards the recess. The deflection pad may be included in a system that includes a torsion beam and one or more support racks to which multiple PV modules may be attached, where the support are racks attached to the torsion beam. One or more deflection pads may be positioned on the support racks to be below the PV modules.

12 Claims, 11 Drawing Sheets

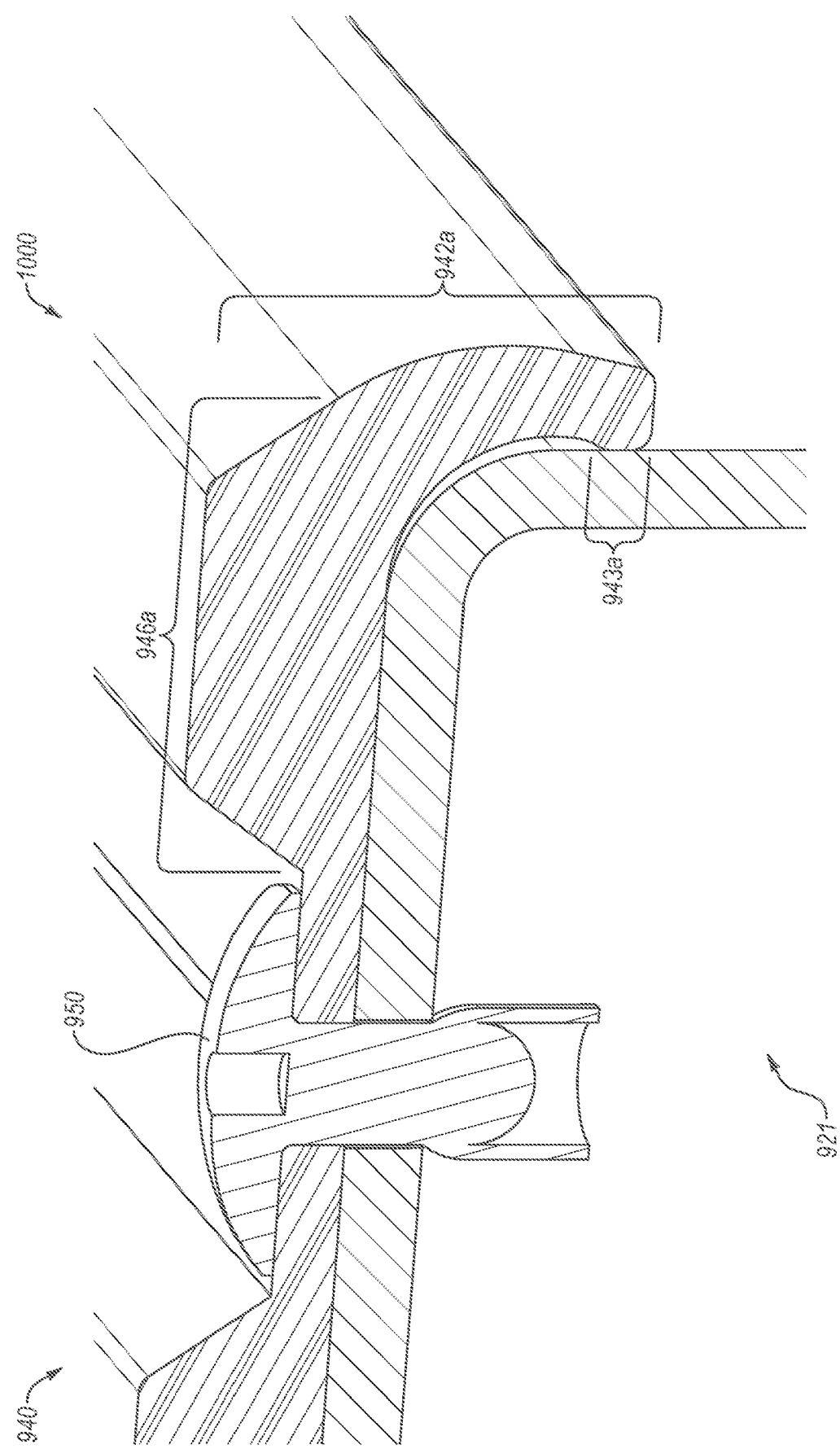

PHOTOVOLTAIC MODULE DEFLECTION LIMITER

CROSS-REFERENCE TO RELATED APPLICATIONS

This application claims the benefit of U.S. Patent Application Ser. No. 63/130,177, filed on Dec. 23, 2020; the disclosure of which is incorporated herein by reference in its entirety.

TECHNICAL FIELD

The present disclosure relates to use of a photovoltaic (PV) module deflection limiter to soften impacts to PV modules.

BACKGROUND

Systems of solar panels may include one or more PV modules. Each of the PV modules may be attached to a support rack. The PV modules may be mounted in rows on solar trackers that direct an orientation of the PV modules such that the orientation of the PV modules changes throughout a day. The PV modules may be placed in an outdoor location such that the PV modules may receive sunlight with little or no obstruction.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a deflection pad that may include a body including two peaks, and a recess in the body between the two peaks, the recess may be sized to accommodate a fastener such that when deployed, the fastener is below a height of the two peaks within the recess. The deflection pad may include arms projecting in a direction generally opposite the two peaks, the arms biased inward towards the recess.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which:

FIG. 11 illustrates an additional close up view of the portion of the example PV module system of FIG. 9.

DETAILED DESCRIPTION

Figure 1:
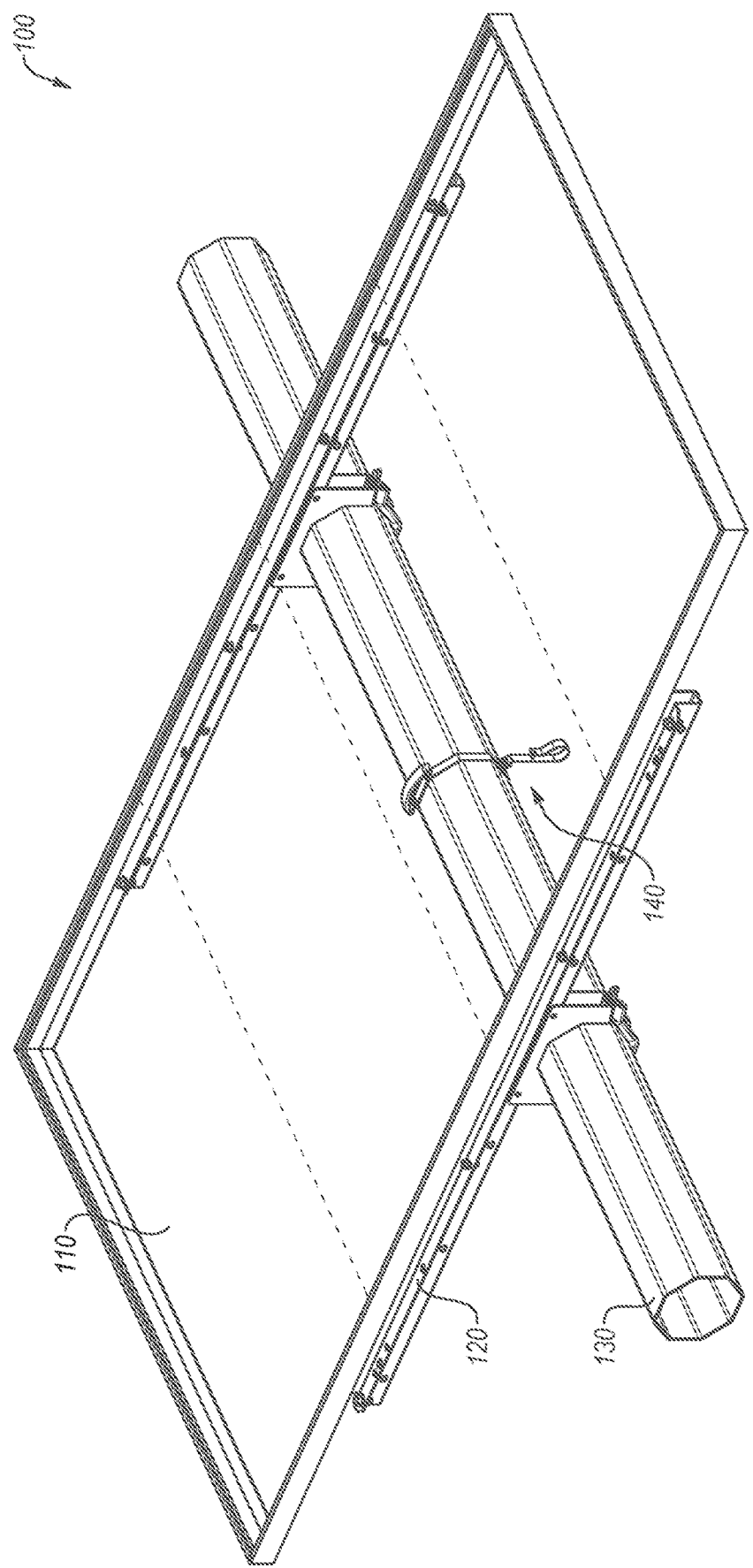
FIG. 1 illustrates an example embodiment of a PV module system including a deflection limiter system.

A PV module may be positioned in an outdoors environment to increase exposure of the PV module to sunlight such that more photons of energy are absorbed by the PV module. The number of photons absorbed may be further increased by increasing a surface area of the PV module. However, the PV module may experience increased deflection in a center of the PV module as the surface area of the PV module increases. The deflection in the center of the PV module may be further increased by, for example, wind and/or snow loads caused by weather conditions. As the PV module deflects, the PV module may impact a supporting structure, such as the torsion beam to which the PV module is coupled, causing damage to glass of the PV module, solar cells within the PV module, solder joints between the solar cells, and/or other electrical components within the PV module.

Existing methods and/or systems may reduce issues or problems associated with deflection of the PV module by increasing a distance between the PV module and supporting structures of the PV module. For example, a height of clamps securing the PV module to a torsion beam may be increased to increase a distance between the PV module and the torsion beam. However, such methods and/or systems of reducing issues or problems associated with deflection may allow the PV module to deform more freely under stress loads, which may result in even higher overall stress to the PV module. Other existing methods and/or systems may reduce deflection of the PV module by providing additional rigidity to the center of the PV module. However, a rigid center may reduce overall structural integrity of the PV module under load and including some amount of clearance below the PV module to allow some deflection may improve structural integrity of the PV module.

The present disclosure relates to, among other things, use of a deflection limiter system to soften impacts to a PV module caused by deflection of the PV module and/or to limit the magnitude of deflection of the PV module to a point where component damage is mitigated. The PV module may be mounted on a torsion beam such that orientation of the PV module may be changed by rotating the torsion beam. The deflection limiter system may be attached to a torsion beam such that orientation of the deflection limiter system may correspond to the orientation of the PV module. The deflection limiter may be positioned between the torsion beam and the PV module such that deflection of the PV module is mitigated by the deflection limiter in at least one direction. The deflection limiter may include a deflection pad for cushioning impact between the PV module and the supporting structures. In some embodiments, the deflection pad may include a leaf spring. In some embodiments, the deflection limiter may include only a leaf spring without a deflection pad. In some embodiments, the deflection limiter system may include a cable management feature.

The deflection limiter system according to the present disclosure may reduce stress experienced by the PV module during deflection impacts by cushioning the deflection impacts and/or limiting the magnitude of deflection. Cushioning the deflection impacts experienced by the PV module may improve longevity of the PV module by reducing damage or degradation to the PV module over time. The deflection limiter system according to the present disclosure may have a low manufacturing cost. The deflection limiter system according to the present disclosure may be coupled to existing PV modules and/or solar panel systems. In some embodiments, the deflection limiter system according to the present disclosure may improve cable management of the PV module(s) and/or solar panel systems by including a cable management feature.

Embodiments of the present disclosure are explained with reference to the accompanying figures.

FIG. 1 illustrates a diagram of an example PV module assembly 100 that includes a deflection limiter system 140. The assembly 100 may include a PV module 110 mounted on a support rack 120, a torsion beam 130 to which the support rack 120 may be attached, and the deflection limiter system 140 attached to the torsion beam 130. The support rack 120 and/or other hardware may be used to mount the PV module 110 to the torsion beam. The support rack 120 may include any module attachment mechanism to which the PV module 110 may be attached, such as a clamp, a purlin, a bracket, etc. In some embodiments, the PV module 110 may be attached to the support rack 120 in such a way that a gap exists between the PV module 110 and the torsion beam 130. In some embodiments, the PV module 110 may be frameless and mounted on the support rack 120 without the PV module 110 being attached to a frame. The torsion beam 130 may be any shape, including but not limited to, round, square, hexagonal, octagonal, or any hybrid shape such as rounded with one or more flat sides. The support rack 120 may be mounted on the torsion beam 130 such that rotation of the torsion beam 130 causes a corresponding rotation of the support rack 120 and the PV module 110 attached to the support rack 120.

The deflection limiter system 140 may be attached to the torsion beam 130 such that at least a portion of the deflection limiter system 140 is positioned between the torsion beam 130 and the PV module 110. The deflection limiter system 140 may be attached to the torsion beam such that rotation of the torsion beam 130 corresponds to rotation of the deflection limiter system 140. The deflection limiter system 140 may be attached to the torsion beam 130 by a strap securing the deflection limiter system 140 around a circumference of the torsion beam 130 as described in more detail below in relation to FIG. 3A. One of the advantages for at least some of the disclosed embodiments is the ability to attach the deflection limiter system 140 to a torsion beam of an existing PV module assembly and/or remove a previously installed deflection limiter system 140 without removing PV modules 110.

Figure 2:
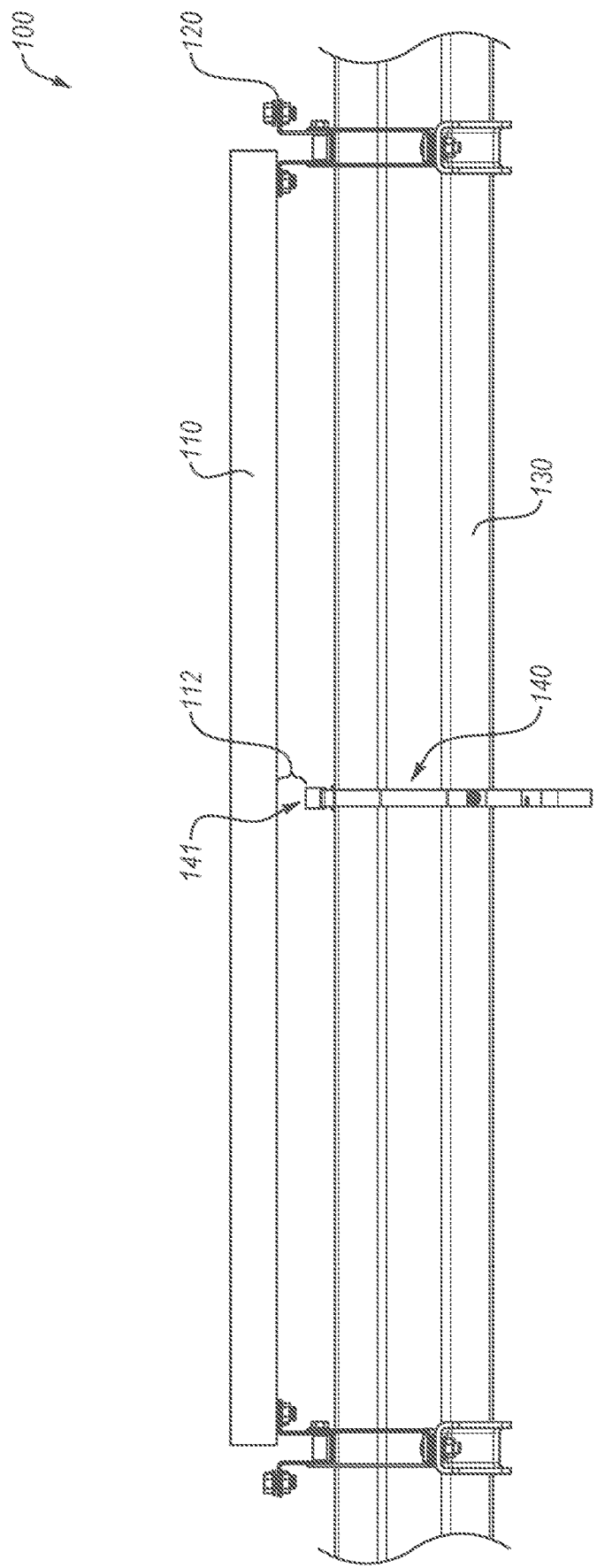
FIG. 2 illustrates a side view of the example embodiment of the PV module system including the deflection limiter system of FIG. 1.

FIG. 2 illustrates a side view of the example embodiment of the PV module assembly 100 including the deflection limiter system 140 that shows a gap 112 between PV module 110 and the deflection limiter system 140 based on positioning of the support rack 120 and the torsion beam 130. As shown in FIG. 2, the deflection limiter system 140 may include a top surface 141 thereof positioned in the gap 112 between the PV module 110 and the torsion beam 130.

Figure 3B:
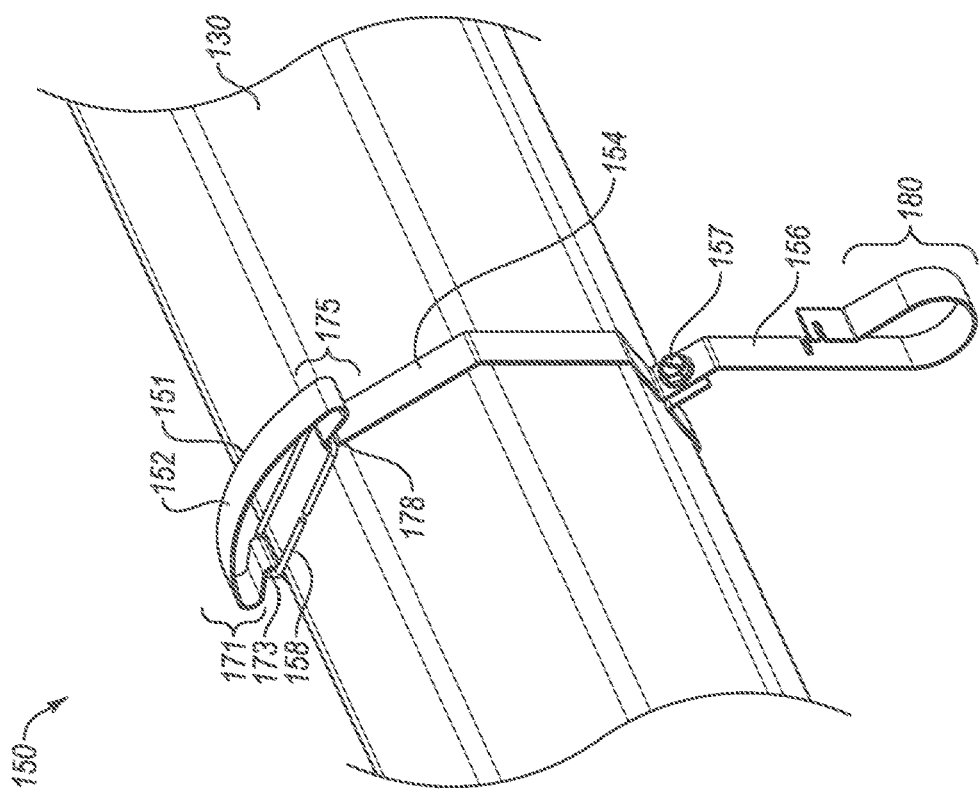
FIG. 3B illustrates a close-up view of the example embodiment of the PV module system of FIG. 1 including an alternative embodiment of a deflection limiter system.
Figure 3A:
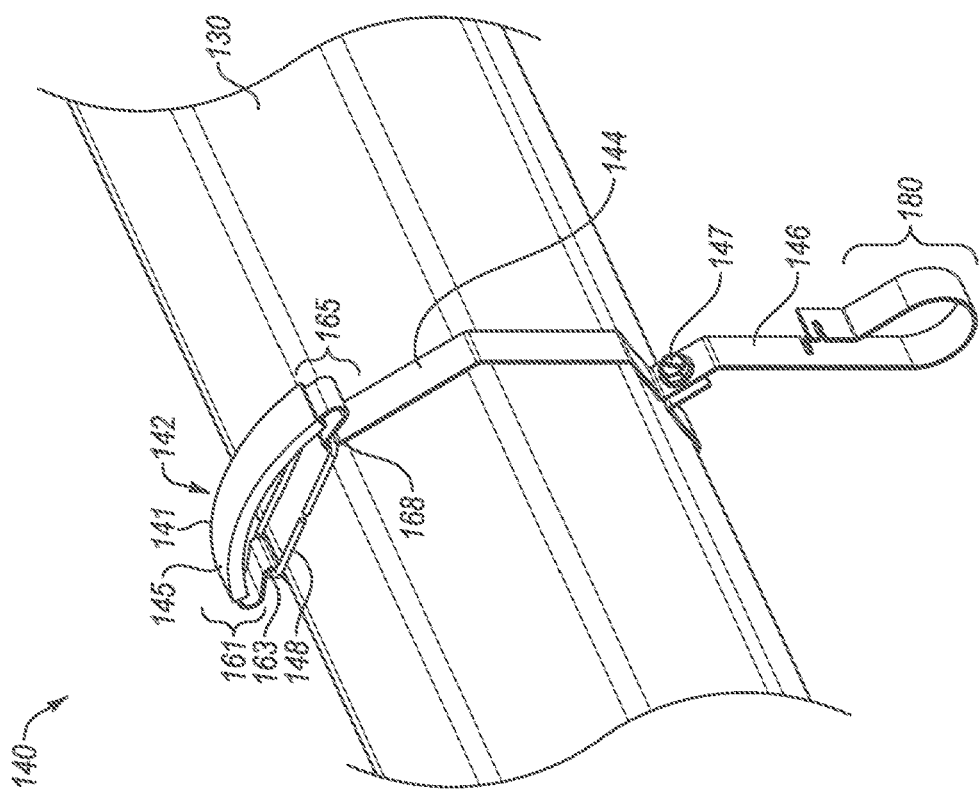
FIG. 3A illustrates a close-up view of the example embodiment of the PV module system including the deflection limiter system of FIG. 1.

FIG. 3A illustrates a close-up perspective view of the deflection limiter system 140 attached to the torsion beam 130. The deflection limiter system 140 may include a compliant portion, such as a leaf spring 142, a strap 144, a cable management apparatus 146, a fastener 147, and a tensile connection wire 148. The leaf spring 142 may be formed from a portion of the strap 144 and include an arced top surface 141. In some embodiments, the leaf spring 142 may be covered by a padding material 145, such as a rubber coat, a cloth wrap, or any other such compliant material or mechanism. Additionally or alternatively, the top surface 141 of the leaf spring 142 may include a flat or a substantially flat surface. The top surface 141 may be defined by a first end 161 and a second end 165 formed from portions of the strap 144. In some embodiments, the first end 161 and the second end 165 may be formed by bending portions of the strap 144 to form rounded ends that pinch toward one another. For example, the first end 161 may include an indentation 163 formed by pinching the strap 144 in a direction toward the second end 165, and the second end 165 may include an indentation 168 formed by pinching the strap 144 in a direction toward the first end 161. In operation, as a surface of the PV module interfaces (e.g., makes contact with) with the top surface 141 of the leaf spring 142, the leaf spring 142 may deform towards the torsion beam 130 to absorb and/or dissipate some or all of the force from the deflection of the PV module.

In some embodiments, the leaf spring 142 may have a curved surface such that as the leaf spring 142 deforms due to downward pressure on the leaf spring 142, the surface of the leaf spring 142 interfacing with the PV module exerting the downward force is larger so that the increased force is spread more evenly across the increased surface area.

In the embodiments shown in FIG. 3A, the tensile connection wire 148 may be a ring positioned at a base of the leaf spring 142 by looping the tensile connection wire 148 around the first end 161 through the indentation 163 and the second end 165 through the second indentation 168 of the leaf spring 142 such that the tensile connection wire 148 is positioned above and/or flush against a top surface of the torsion beam 130. The tensile connection wire 148 may be made of a flexible or semi-flexible material, such as steel, plastic, composite, etc. The tensile connection wire 148 may be a ring shaped as a rectangular loop with rounded corners, an oval, a D-ring, or any other suitable shape or configuration.

The strap 144 may include a strip of material that may be configured into a given shape by bending, forming, stamping, rolling, extruding, casting, molding, the strip of material. The strap 144 may be shaped and/or sized to correspond to and interface with the outer circumference and/or the shape of the torsion beam 130. For example, the strap 144 may include an octagonal shape if the outer surface of the torsion beam 130 defines an octagonal shape. In this example, the circumference of the strap 144 may be longer than an outer circumference of the torsion beam 130 to allow the strap 144 to be fitted around the exterior of the torsion beam 130. The strap 144 may be made of steel, plastic, composite, or any other suitable rigid or semi-rigid material.

In some embodiments, the deflection limiter system 140 may include the cable management apparatus 146 as described in more detail below in relation to FIG. 5. In some embodiments, the cable management apparatus 146 may include a loop 180 formed from a portion of the strap 144. For example, the portion of the strap may form the loop 180 by closing the loop 180 against itself. Additionally or alternatively, the cable management apparatus 146 may include a separate strip formed from the same or a substantially similar material as the strap 144 and attached to the strap 144 by a fastener 147. The fastener 147 may include any apparatus capable of connecting the strap 144 and the cable management apparatus 146, such as a screw, a bolt, a clip, a weld, or other suitable attachment mechanism. Additionally or alternatively, the fastener 147 may close the strap 144 into a single loop that is tight against the torsion beam. In some embodiments, the cable management apparatus 146 may be welded to the strap 144, and the fastener 147 may be omitted from the deflection limiter system 140.

In some embodiments, the cable management apparatus 146 may be a continuation of the length of the strap 144 and the fastener 147 may fix the strap 144 about the torsion beam 130.

FIG. 3B illustrates a close-up perspective view of a second example embodiment of a deflection limiter system 150. The deflection limiter system 150 may include a deflection mechanism, such as leaf spring 152, a strap 154, a cable management apparatus 156, a fastener 157, and a tensile connection wire 158. The leaf spring 152 may include a first end 171 with a first indentation 173 and a second end 175 with a second indentation 178 that may be similar or comparable to the first end 161 with the first indentation 163 and the second end 165 with the second indentation 168. The strap 154, the cable management apparatus 156, the fastener 157, and the tensile connection wire 158 may be similar or comparable to the strap 144, the cable management apparatus 146, the fastener 147, and/or the tensile connection wire 148, respectively, shown in FIG. 3A. As illustrated in FIG. 3B, a top surface 151 of the leaf spring 152 may be unpadded. In these and other embodiments, deflection of the PV module 110 may cause the PV module 110 to contact the unpadded top surface 151 of the leaf spring 152.

Figure 4A:
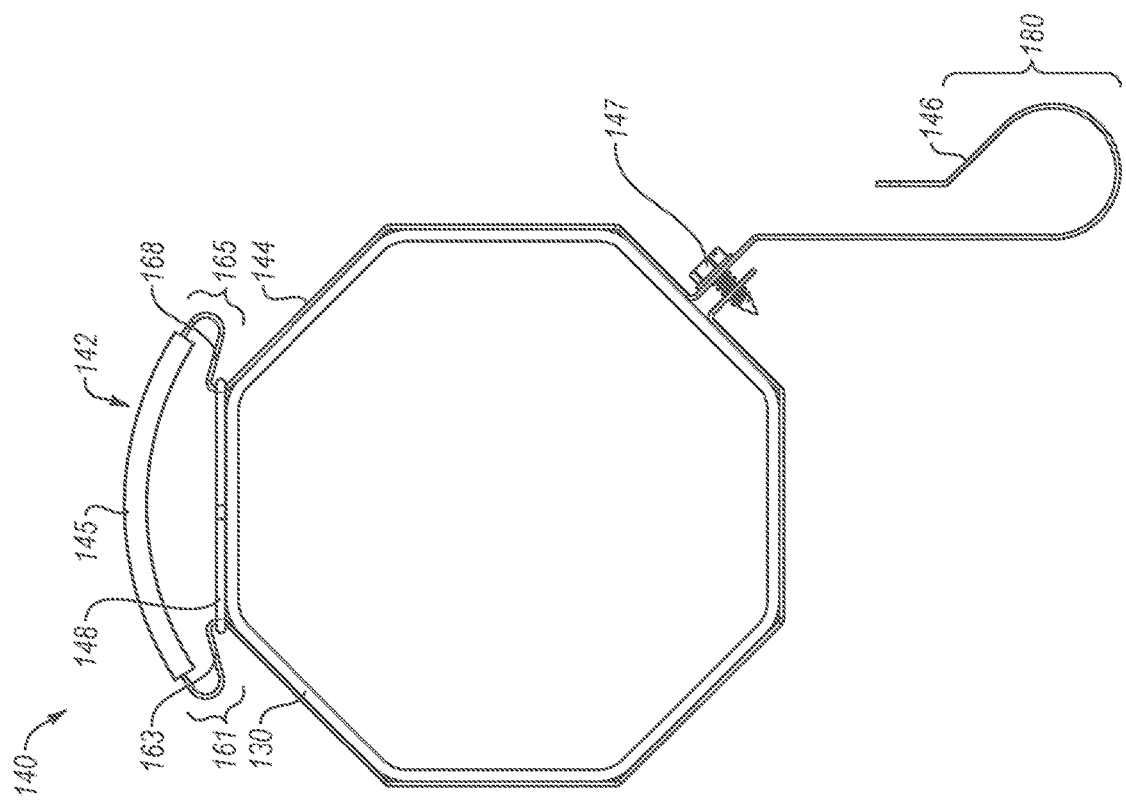
FIG. 4A illustrates a side view of the deflection limiter system of FIG. 1 in which the deflection limiter system is not attached to a torsion beam.
Figure 4B:
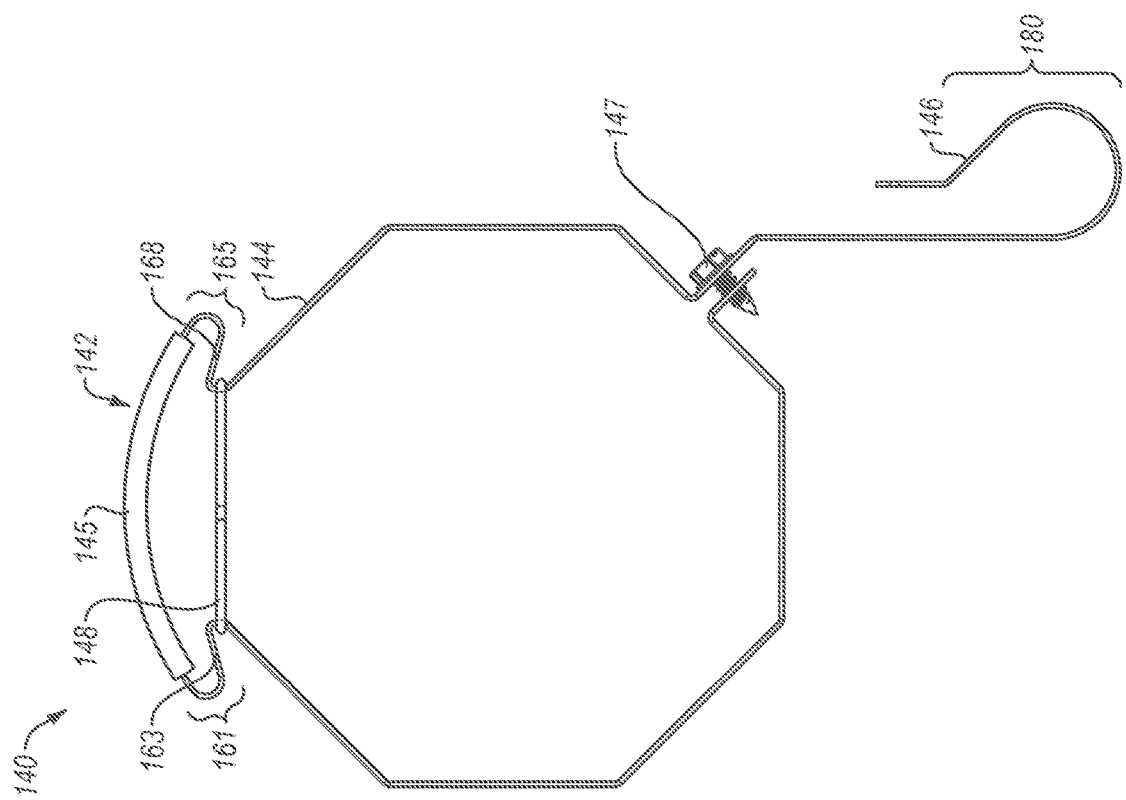
FIG. 4B illustrates a side view of the deflection limiter system of FIG. 1 in which the deflection limiter system is attached to the torsion beam.

FIG. 4A illustrates a side view of the deflection limiter system 140, and FIG. 4B illustrates a side view of the deflection limiter system 140 attached to the torsion beam 130. The side views of the deflection limiter system 140 illustrated in FIGS. 4A and 4B show the fastener 147 connecting a first section of the strap 144 and a second section of the strap 144 about the torsion beam 130.

Figure 5:
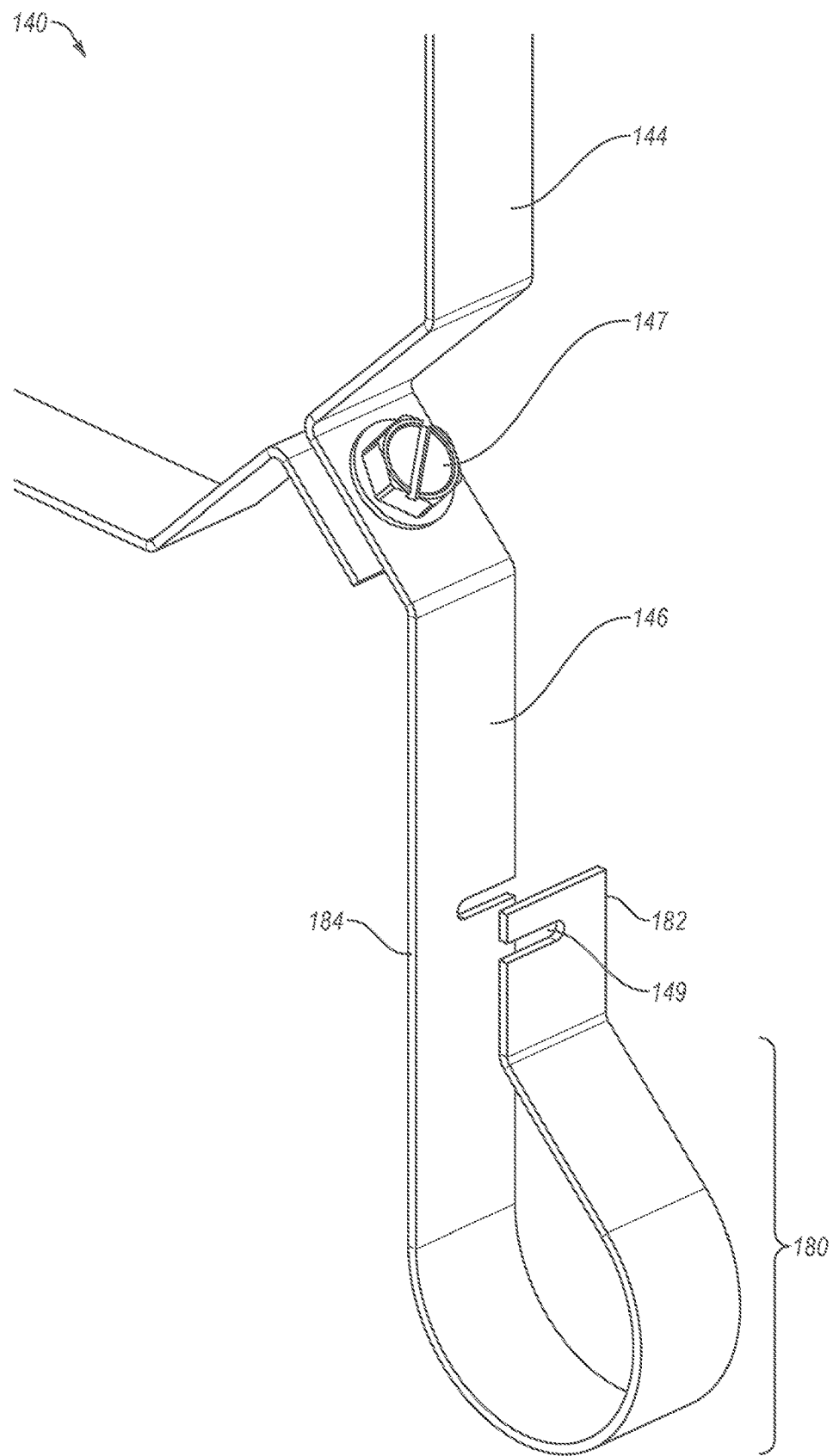
FIG. 5 illustrates a close-up view of a cable management attachment attached to the deflection limiter system of FIG. 1.

FIG. 5 illustrates a close-up view of a bottom portion of the deflection limiter system 140 focusing on the cable management apparatus 146. The cable management apparatus 146 may include a loop formed by fastening a first section 182 of the strap 144 to a second section 184 of the strap 144. For example, the first section 182 of the strap 144 and the second section 184 of the strap 144 may be fastened together by interfacing grooves 149 etched or otherwise formed into each section of the strap 144 to form the loop 180.

In some embodiments, a size of the loop 180 may be increased or decreased by changing a length of the strap 144 used to form the loop 180. A loop 180 with a larger diameter may be formed by increasing a distance between the first section 182 of the strap 144 and the second section 184 of the strap 144 to include a longer length of the strap 144. A loop 180 with a smaller diameter may be formed by decreasing the distance between the first section 182 of the strap 144 and the second section 184 of the strap 144. In some embodiments, more than one groove 149 may be included in a given section of the strap 144 such that the size of the loop 180 may be adjusted. In some embodiments, the cable management apparatus 146 may be formed from an end of the strap 144. An advantage of forming the cable management apparatus 146 from the end of the strap 144 is that excess length of the strap 144 not included in circumscribing the torsion beam 130 and the leaf spring 142 may be included as part of the cable management apparatus 146 to prevent wasting manufacturing materials.

Figure 6:
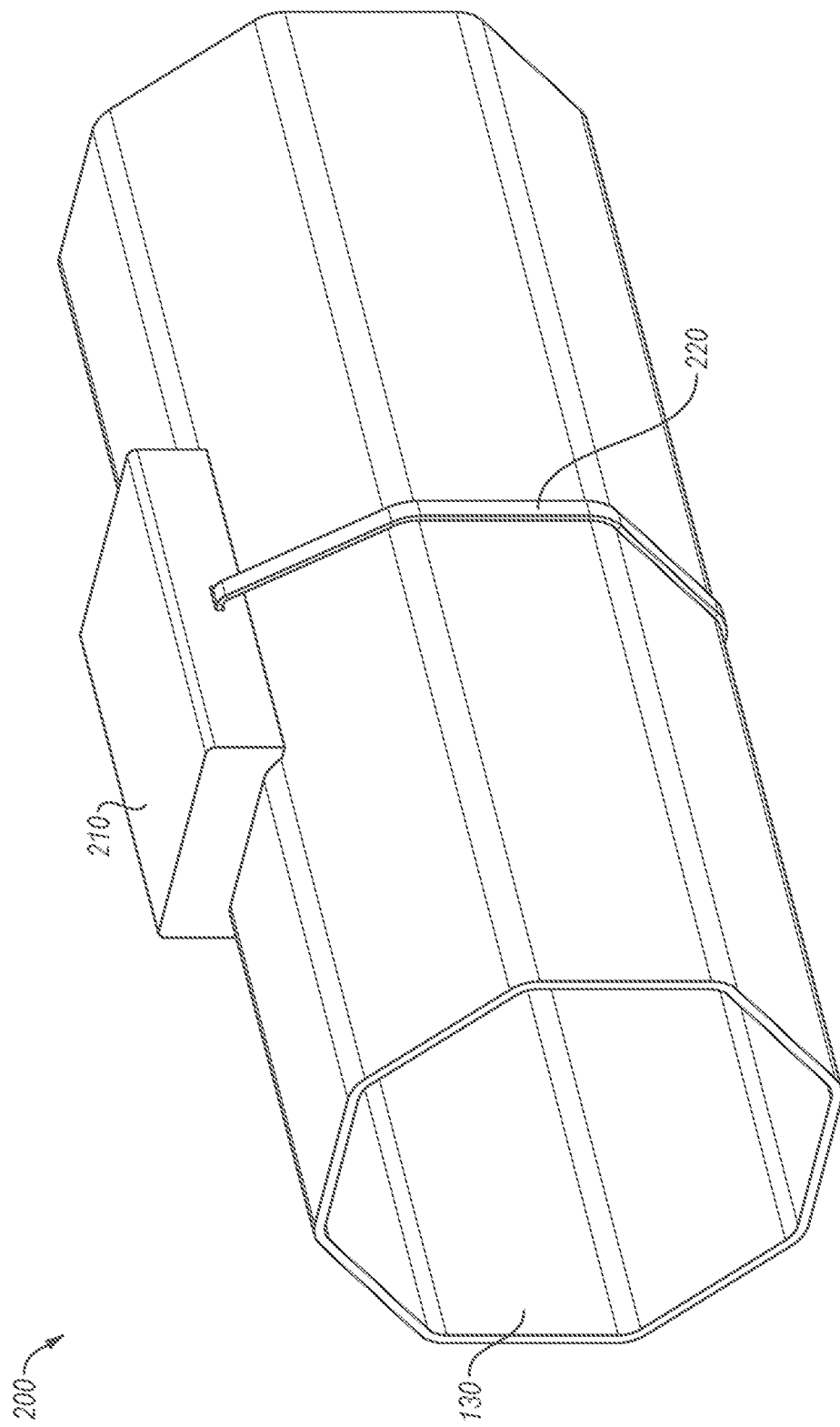
FIG. 6 illustrates another example embodiment of a deflection limiter system.

FIG. 6 illustrates a close-up perspective view of a second example embodiment of a deflection limiter system 200 attached to the torsion beam 130. The example deflection limiter system 200 may include a deflection pad 210 and a strap 220. The deflection pad 210 may be positioned between the torsion beam 130 and a PV module, such as the PV module 110 of FIGS. 1 and 2, mounted above the torsion beam 130. The deflection pad 210 may be constructed of a semi-rigid or elastic material such as rubber, foam, plastic, composite, or similar material. In some embodiments, the deflection pad 210 may be positioned underneath approximately the middle of the PV module along the torsion beam 130. Additionally or alternatively, more than one deflection pad 210 may be included in the deflection limiter system 200 and positioned below the PV module. In these and other embodiments, the two or more deflection pads 210 may or may not be evenly spaced to avoid protrusions underneath the PV module and/or to increase a contact surface between deflection of the PV module and the deflection pads 210 coupled to the torsion beam 130.

In some embodiments, the deflection pad 210 may be secured to the torsion beam 130 by a strap 220. In some embodiments, the strap 220 may be made of the same or similar material as the strap 144 of the deflection limiter system 140. For example, the strap 220 may be made of steel, plastic, composite, or any other flexible or semi-flexible material. In some embodiments, the strap 220 may include a zip tie or other rapidly coupling and locking mechanisms to fixedly couple the deflection pad 210 to the torsion beam 130.

Figure 7:
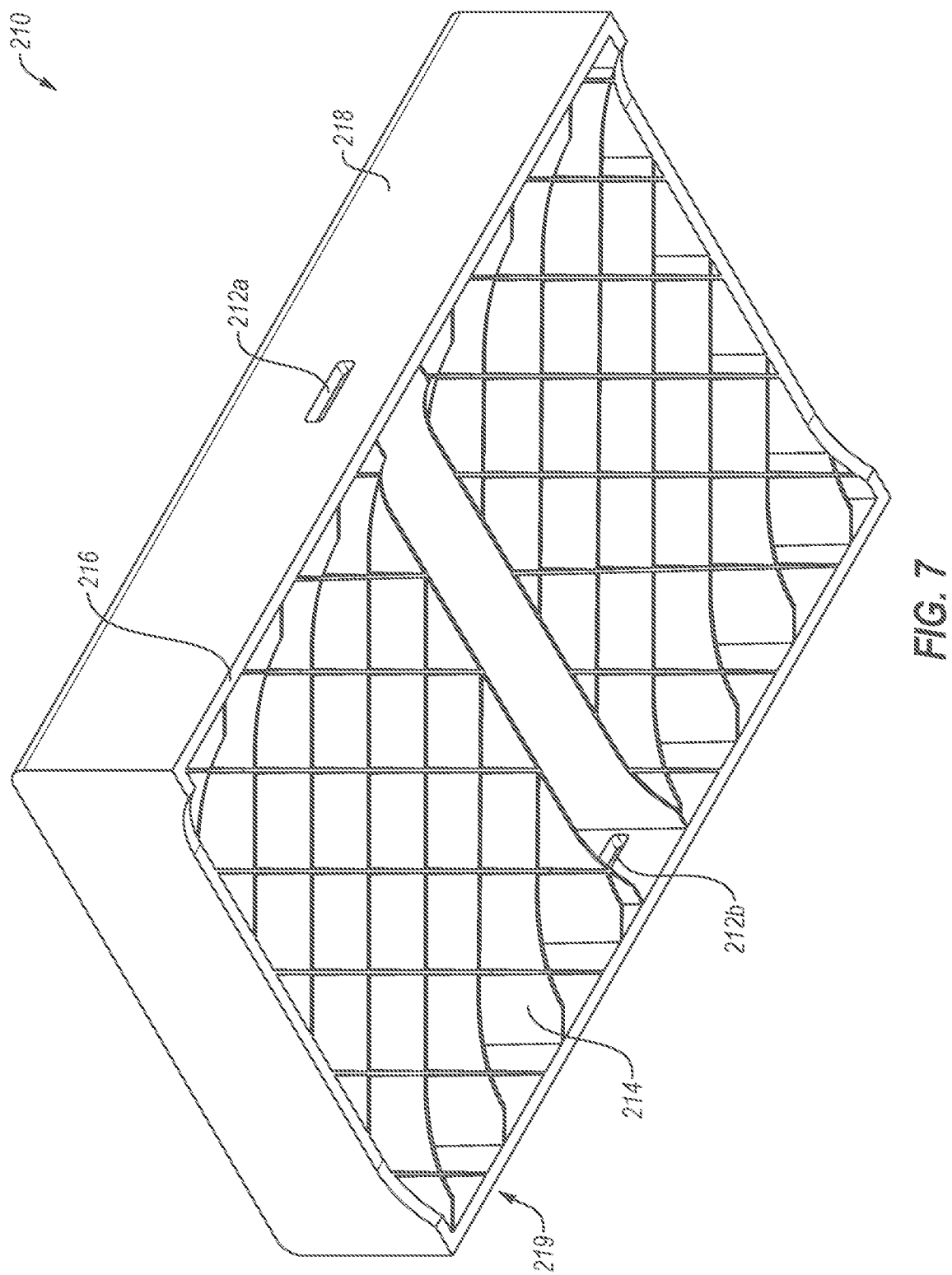
FIG. 7 illustrates a close-up view of a deflection pad included in the example embodiment of the deflection limiter system illustrated in FIG. 6.

FIG. 7 illustrates a perspective view of the deflection pad 210. As seen in FIG. 7, the deflection pad 210 may include a hole 212, slot, or other similar opening, and one or more reinforcing ribs 214. The hole 212 may be an opening in a side of the deflection pad 210 through which the strap 220 may interface to secure the deflection pad 210 to the torsion beam 130. More than one hole 212 may be included in the deflection pad 210 to provide more openings through which the strap 220 may interface to better secure the deflection pad 210 to the torsion beam 130. For example, a first hole 212a may be included in a first side 218 of a given deflection pad and a second hole 212b may be included in a second side 219 of the given deflection pad in which the second side is opposite to the first side. In this example, a given strap may pass through the first hole and the second hole and circumscribe a given torsion beam to which the given deflection pad is mounted. Additionally or alternatively, additional holes 212 may be included such that multiple straps 220 may be used to couple the deflection pad 210 to the torsion beam 130.

Figure 8A:
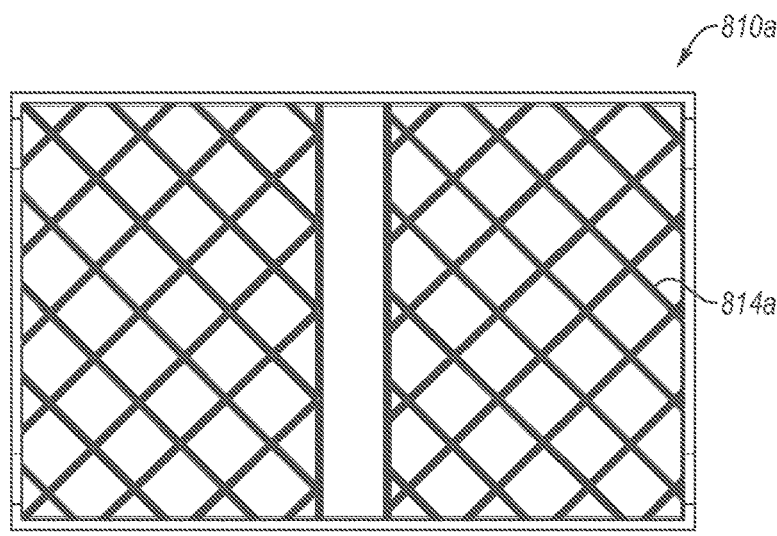
FIGS. 8A-8C illustrates various example patterns of the deflection pad of FIG. 7.
Figure 8B:
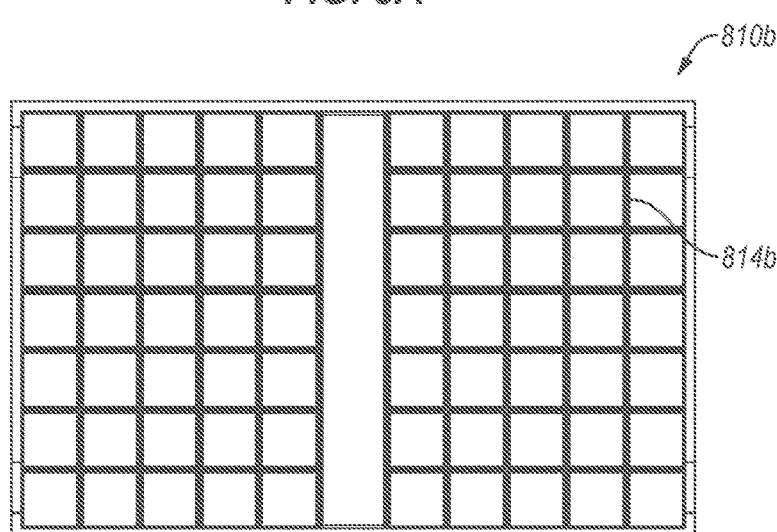
Figure 8C:
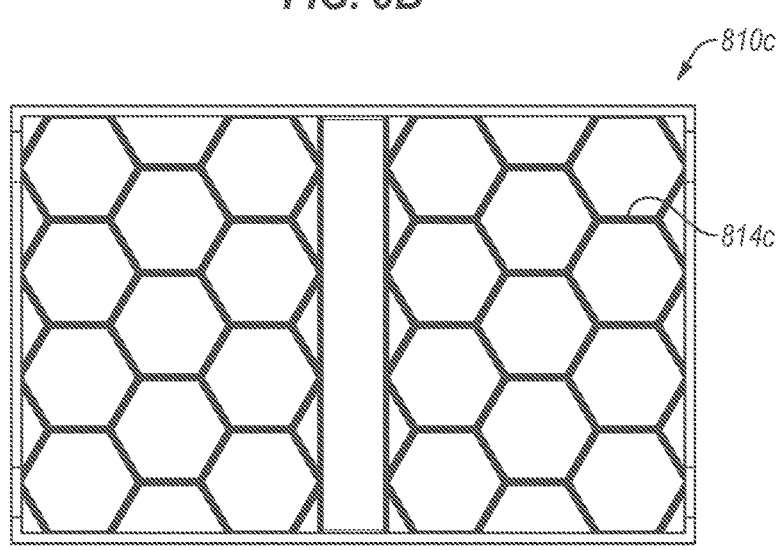

In some embodiments, the deflection pad 210 may be injection molded or extruded such that the deflection pad 210 includes the reinforcing ribs 214. The reinforcing ribs 214 may include honeycomb-like structures that further distribute a load experienced by the deflection pad 210 and/or the deflection limiter system 200 caused by deflection of the PV module positioned above the deflection pad 210. The reinforcing ribs 214 may be shaped in a pattern such as squares, triangles, hexagons, any other polygonal shape, and/or any circular shape. FIG. 8A-8C provide some examples of such variations. In some embodiments, the deflection pad 210 may include a tessellating pattern of reinforcing ribs 214. Additionally or alternatively, the deflection pad 210 may include reinforcing ribs 214 including more than one shape in a non-repeating pattern, such as a combination of hexagons and triangles. In these and other embodiments, the pattern may include a gap in the pattern, such as a region through which the strap 220 may pass through the pattern of the reinforcing ribs 214.

In some embodiments, the reinforcing ribs 214 may project from one or more different faces of the deflection pad. For example, as illustrated in FIG. 7, the reinforcing ribs 214 may project away from a surface facing the PV module and towards the torsion beam 130. As another example, the reinforcing ribs 214 may project away from a surface interfacing with the torsion beam 130 and extend towards the PV module. As a further example, the reinforcing ribs 214 may extend from a surface in a central region and extend towards the torsion beam 130 and also extend from the central region towards the PV module.

In some embodiments, the reinforcing ribs 214 may be more thin in material than the outer ridge 216 of the deflection pad 210. Additionally or alternatively, the reinforcing ribs 214 may be patterned or have cutouts to remove material. In these and other embodiments, such cutouts or patterns may increase the flexibility and/or deformation capabilities of the deflection pad 210.

FIGS. 8A-8C illustrates various example patterns of the deflection pad 210 of FIG. 7, in accordance with one or more embodiments of the present disclosure. For example, FIG. 8A illustrates a deflection pad 810a forming a first pattern using reinforcing ribs 814a, FIG. 8B illustrates a deflection pad 810b forming a second pattern using reinforcing ribs 814b, and FIG. 8C illustrates a deflection pad 810c forming a third pattern using reinforcing ribs 814c.

The first pattern illustrated in FIG. 8A illustrates a checkered pattern or a pattern built using repeated square shapes. The repeating square shapes are tilted at an angle in the first pattern.

The second pattern illustrated in FIG. 8B illustrates a checkered pattern or a pattern built using repeated square shapes. The repeating square shapes are aligned with the orientation of the deflection pad 810b.

The third pattern illustrated in FIG. 8C illustrates a honeycomb pattern or a pattern built using repeated hexagonal shapes.

While FIGS. 8A-8C illustrate three example patterns, it will be appreciated that any number and style of patterns are contemplated by the present disclosure. Additionally, any randomization or other style, such as variations in spacing between the reinforcing ribs, are also contemplated. As another example, the reinforcing ribs may be implemented as small cylindrical projections rather than ribs.

Figure 9:
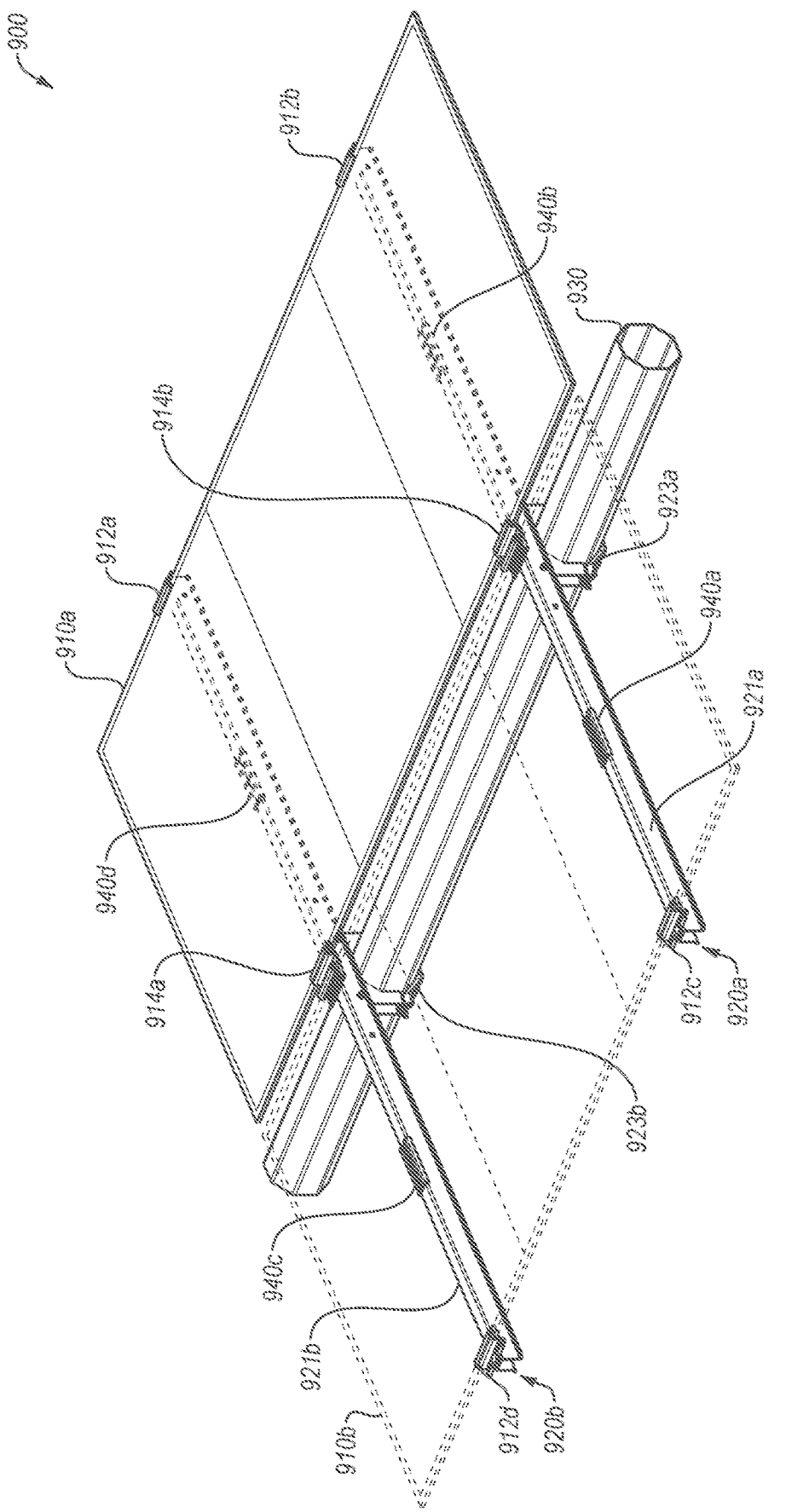
FIG. 9 illustrates another example embodiment of a PV module system including another example deflection limiter system.

FIG. 9 illustrates another example embodiment of a PV module system 900 including another example deflection limiter system 940, in accordance with one or more embodiments of the present disclosure.

The PV module system 100 of FIG. 1 includes a single PV module 110 running along the length of the torsion beam 130, while the PV module system 900 of FIG. 9 includes two PV modules 910 (such as the PV modules 910a and 910b) in a landscape orientation along the torsion beam 930 (e.g., a 2L configuration). The PV module system 900 may include one or more PV modules 910 (such as the PV modules 910a and 910b) which may be similar or comparable to the PV module 110 of FIG. 1, one or more support racks 920 (such as the support racks 920a/920b) which may be similar or comparable to the support rack 120 of FIG. 1, and/or a torsion beam 930 which may be similar or comparable to the torsion beam 130 of FIG. 1. Additionally or alternatively, the PV module system 900 may include one or more end brackets 912 (such as the brackets 912a-912d) and/or mid brackets 914 (such as the mid brackets 914a/914b) which may be used to secure the PV modules 910 to the support racks 920. Additionally or alternatively, the PV module system 900 may include one or more deflection pads 940 (such as the deflection pads 940a-940d).

The PV modules 910 may be mounted to the support racks 920 by the end brackets 912 and/or mid brackets 914 clamping down on the PV module 910 to hold them in place along the support racks 920. The support racks 920 may be coupled to the torsion beam 930. For example, the support racks 920 may include a rail 921 (such as the rails 921a/921b) and/or a clamp 923 (such as the clamps 923a/923b) that couples the rail 921 to the torsion beam 930. While the illustrated support rack 920 is one example of fixedly coupling the PV modules 910 to the torsion beam, 930, it will be appreciated that any approach may be used to mount the PV modules 910 to the torsion beam 930. Additionally or alternatively, the PV modules 910 may be mounted to any support structure, such as one or more rails. Additionally or alternatively, any number or orientation of PV modules 910 is contemplated within the present disclosure. For example, the PV modules 910 may be orientated in portrait or landscape. As another example, any number, such as one, two, three, four, or more, may be used (e.g., three in landscape (3L)).

The PV modules 910 may bend or deflect towards the support rack 920 from forces such as snow, wind, and/or the weight of the PV modules 910 themselves. In these and other embodiments, the deflection pads 940 may operate to prevent the PV modules 910 from directly contacting the rail or other portions of the support rack 920. Instead, the PV modules 910 may physically contact the deflection pads 940. In these and other implementations, the deflection pads 940 may be constructed of an elastically compressible material such as rubber, foam, plastic (e.g., polycarbonate, polyvinyl chloride (PVC), polythene, polyethylene, or other polymers), or composites, or a coating of such a material on a more abrasive material such as metal. In these and other embodiments, the deflection pad 940 may be formed of a single body, such as a single molded and/or cured piece of rubber.

In some embodiments, the deflection pads 940 may be positioned such that the PV modules 910 already rest on the deflection pads 940 even without deformation. Additionally or alternatively, there may be a gap between the deflection pads 940 and the PV modules 910 in normal circumstances, and due to external forces or PV module 910 deformation over time, the PV modules 910 may deflect and contact the deflection pads 940.

While illustrated with a single deflection pad 940 along the support rack 920 for a given span of PV module 910, it will be appreciated that any number of deflection pads 940 may be positioned along the length of the support rack 920. For example, two, three, four, or more deflection pads 940 beneath a given PV module 910 along the support rack.

Figure 10:
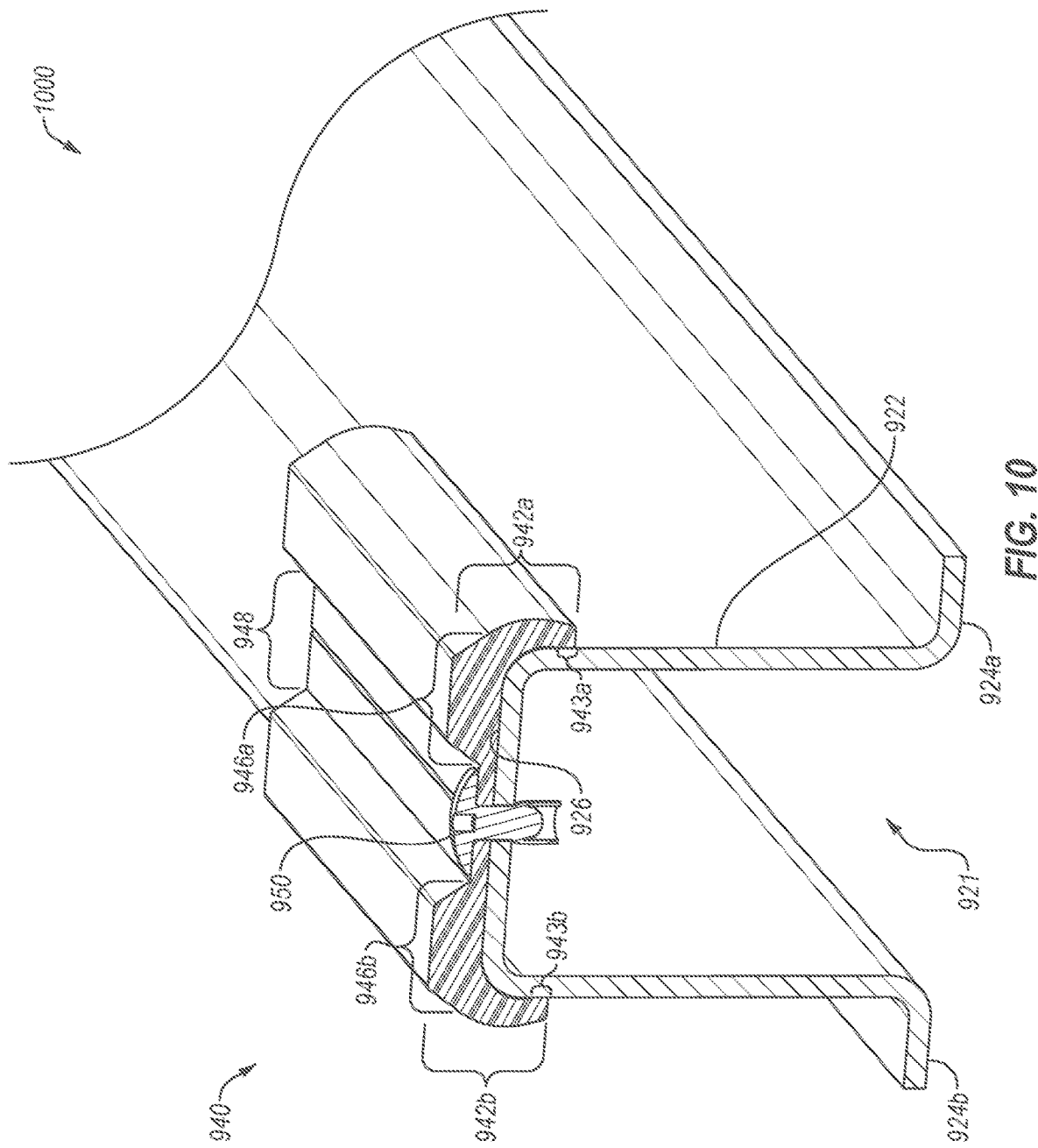
FIG. 10 illustrates a close up view of a portion of the example PV module system of FIG. 9.

FIG. 10 illustrates a close up view of a portion 1000 of the example PV module system 900 of FIG. 9, in accordance with one or more embodiments of the present disclosure. For example, as illustrated in FIG. 10, the support rack 920 may include a rail 921 with a top portion 922 and tabs 924a and 924b at either end of the top portion 922.

The deflection pad 940 may be shaped and/or configured to sit atop the top portion 922 of the rail 921 of the support rack 920. For example, the deflection pad 940 may be shaped with two arms 942a/942b to project and snugly extend from a top surface 926 of the top portion 922 and along some length of the top portion 922 towards the fingers 924a/924b. In some embodiments, the arms 942a/942b may include a respective tab 943a/943b at the end of the arms 942a/942b to create a stronger frictional/interference fit between the deflection pad 940 and the sides of the top portion 922 of the rail 921 of the support rack 920.

The deflection pad 940 may include a recess 948 between peaks 946a and 946b. The peaks 946a/946b may provide additional cushioning material for the PV module when it deforms or sags and contacts the deflection pad 940. The recess 948 may operate as a recess within which a fastener 950 may fixedly couple the deflection pad 940 to the top portion 922 of the rail 921 of the support rack 920. In these and other embodiments, by utilizing the recess 948, the head of the fastener 950 may be below the peaks 946 such that the PV module is prevented from contacting the fastener 950, even with some deformation of the peaks 946 due to the PV module contacting and compressing the peaks 946. In these and other embodiments, the deflection pad 940 may be longer along a direction in line with the peaks 946 (e.g., in the direction along the length of the support rack 920) than it is in a direction across the peaks 946 and the recess 948 (e.g., in a direction orthogonal to the length of the support rack 920).

In some embodiments, by using the arms 942a/b, a single fastener 950 may be used to fix the deflection pad 940 to the top portion 922 without the deflection pad 940 rotating or moving relative to the single fastener 950. The ability to use a single fastener 950 may speed up installation times and decrease material costs.

While illustrated as a hat rail, it will be appreciated that the rail 921 of the support rack 920 may take any shape or profile. For example, a rectangular tube, a channel, an angled profile, a Z-rail, a sigma-rail, or any other shaped support structure.

FIG. 11 illustrates an additional close up view of the portion 1000 of the example PV module system 900 of FIG. 9, in accordance with one or more embodiments of the present disclosure. As illustrated in FIG. 11, the arm 942a of the deflection pad 940 may include the tab 943a that may be pressed against the top portion 922 of the rail of the support rack 920. For example, the arm 942a may deform due to interference between the tab 943a and the side of the top portion 922. The deformation may create a spring force or other force of the material of the arm 942a due to being biased to its undeformed state. For example, the arm 942a may be biased inwards past the rail in its undeformed state in a direction inwards towards the rail. The spring force may increase the frictional force between the tab 943a and the upper portion 922, thereby holding the deflection pad 940 in place more securely.

While the system 900 illustrated in FIGS. 9-11 may include the deflection pad 940, it will be appreciated that any deflection limiting device consistent with the present disclosure could be used. For example, the deflection limiter system 140 utilizing the leaf spring illustrated in FIG. 1 may be used in place of the deflection pad 940 by modifying the shape or length of the strap. As another example, the deflection pad 210 shown in FIG. 6 may be used in place of the deflection pad 940. In these and other embodiments, a bottom surface of the deflection pad 210 may be shaped to correspond to the shape of the upper portion 922 rather than to interface with the torsion beam 130 directly.

The subject technology of the present invention is illustrated, for example, according to various aspects described below. Various examples of aspects of the subject technology are described as numbered examples (1, 2, 3, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example (e.g., example 2) or examples, or combined with aspects of another example. The following is a non-limiting summary of some example implementations presented herein.

Example 1. A deflection pad that includes a body including two peaks; a recess in the body between the two peaks, where the recess may be sized to accommodate a fastener such that when deployed, the fastener is below a height of the two peaks within the recess; and arms projecting in a direction generally opposite the two peaks, the arms biased inward towards the recess.

Example 2. One or more of the example embodiments of the present disclosure may also include tabs on an end of the arms opposite the two peaks, the tabs extending from the arms generally in the direction in which the arms are biased.

Example 3. For one or more of the example embodiments of the present disclosure, a shape of a bottom surface of the two peaks, the recess, and the arms may correspond to a top portion of a rail.

Example 4. For one or more of the example embodiments of the present disclosure, the arms may be biased inwards to a position beyond the top portion of the rail.

Example 5. For one or more of the example embodiments of the present disclosure, the deflection pad may be constructed of an elastically compressible material.

Example 6. For one or more of the example embodiments of the present disclosure, the deflection pad may be constructed of one of rubber, polycarbonate, polyvinyl chloride, polythene, or polyethylene.

Example 7. For one or more of the example embodiments of the present disclosure, the deflection pad may be longer in a first direction along a length of the peaks than in a second direction across the two peaks and the recess.

Example 8. A system may include a torsion beam; a rack to which multiple PV modules may be attached, the rack attached to the torsion beam; a first end bracket at a first end of the rack and a second end bracket at a second end of the rack opposite the first end; one or more mid brackets spaced along the rack such that the first end bracket, the second end bracket, and the one or more mid brackets cooperatively fixedly couple the multiple PV modules to the rack; a first deflection pad on the rack positioned at least between the first end bracket and a first given mid bracket of the one or more mid brackets so as to be underneath a first given PV module of the multiple PV modules held between the first end bracket and the first given mid bracket; and a second deflection pad on the rack positioned at least between the second end bracket and a second given mid bracket of the one or more mid brackets so as to be underneath a second given PV module of the multiple PV modules held between the second end bracket and the second given mid bracket.

Example 9. For one or more of the example embodiments of the present disclosure, the first deflection pad includes a body including two peaks; a recess in the body between the two peaks, the recess sized to accommodate a fastener fixedly coupling the first deflection pad to the rack such that when deployed, the fastener is below a height of the two peaks within the recess; and arms projecting in a direction generally opposite the two peaks, the arms biased inward towards the recess.

Example 10. For one or more of the example embodiments of the present disclosure, the rack includes a rail.

Example 11. For one or more of the example embodiments of the present disclosure, the first given mid bracket and the second given mid bracket are a same mid bracket such that the system includes a single mid bracket.

Example 12. One or more of the example embodiments of the present disclosure may also include a third deflection pad positioned between the first end bracket and the first given mid bracket.

Example 13. A system may include a torsion beam; a first rack to which a PV module may be attached, the first rack attached to the torsion beam; a second rack to which the PV module may be attached such that the first and the second rack together fixedly couple the PV module to the torsion beam, the second rack attached to the torsion beam; a deflection system coupled to the torsion beam between the first rack and the second rack such that the deflection system is positioned beneath the PV module when the PV module is attached to the first and the second racks. The deflection system may include a deflection pad; and a strap coupled to the deflection pad, the strap securing the deflection pad to the torsion beam.

Example 14. For one or more of the example embodiments of the present disclosure, the deflection pad may include a leaf spring.

Example 15. For one or more of the example embodiments of the present disclosure, the leaf spring maybe formed from a portion of the strap to include a top surface for interfacing with the PV module.

Example 16. For one or more of the example embodiments of the present disclosure, the top surface may include a first end and a second end, the first end including a first indentation pinching in a first direction toward the second end, and the second end including a second indentation pinching in a second direction toward the first end; and a tensile connection wire around a base of the leaf spring and resting in the first indentation and the second indentation.

Example 17. For one or more of the example embodiments of the present disclosure, the top surface of the leaf spring may be covered in a cushioning material Example 18. For one or more of the example embodiments of the present disclosure, a second portion of the strap may form a cable management apparatus, the cable management apparatus.

Example 19. For one or more of the example embodiments of the present disclosure, the loop may be formed by the second portion closing a loop against itself.

Example 20. For one or more of the example embodiments of the present disclosure, the cable management apparatus may facilitate aligning power cables from one or more PV modules, whether wired separately or together, running towards a power inverter, a power storage device, or a power usage device.

Example 21. For one or more of the example embodiments of the present disclosure, the deflection pad may include a plurality of reinforcing ribs extending away from the deflection pad.

Example 22. For one or more of the example embodiments of the present disclosure, the reinforcing ribs may be formed in a pattern.

Example 23. For one or more of the example embodiments of the present disclosure, the reinforcing ribs may extend away from the deflection pad in a direction towards the torsion beam.

Example 24. For one or more of the example embodiments of the present disclosure, the reinforcing ribs extend away from the deflection pad in a direction towards the PV module.

Example 25. For one or more of the example embodiments of the present disclosure, the reinforcing ribs extend both away from the deflection pad in a direction towards the PV module and away from the deflection pad in a direction towards the torsion beam.

Example 26. For one or more of the example embodiments of the present disclosure, the reinforcing ribs are disposed in one of a checkered or honeycomb pattern.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A system comprising:
   a torsion beam;
   a rack to which multiple PV modules may be attached, the rack attached to the torsion beam;
   a first end bracket at a first end of the rack and a second end bracket at a second end of the rack opposite the first end;
   one or more mid brackets spaced along the rack such that the first end bracket, the second end bracket, and the one or more mid brackets cooperatively fixedly couple the multiple PV modules to the rack;
   a first deflection pad on the rack positioned at least between the first end bracket and a first given mid bracket of the one or more mid brackets so as to be underneath a first given PV module of the multiple PV modules held between the first end bracket and the first given mid bracket, the first deflection pad comprising a spring leaf; and
   a second deflection pad on the rack positioned at least between the second end bracket and a second given mid bracket of the one or more mid brackets so as to be underneath a second given PV module of the multiple PV modules held between the second end bracket and the second given mid bracket.

2. The system of claim 1, wherein the rack includes a rail.

3. The system of claim 1, wherein the first given mid bracket and the second given mid bracket are a same mid bracket such that the system includes a single mid bracket.

4. The system of claim 1, further comprising a third deflection pad positioned between the first end bracket and the first given mid bracket.

5. A system comprising:
   a torsion beam;
   a first rack to which a PV module may be attached, the first rack attached to the torsion beam;
   a second rack to which the PV module may be attached such that the first and the second rack together fixedly couple the PV module to the torsion beam, the second rack attached to the torsion beam;
   a deflection system coupled to the torsion beam between the first rack and the second rack such that rotation of the torsion beam corresponds to rotation of the deflection system and such that the deflection system is positioned beneath the PV module when the PV module is attached to the first and the second racks, the deflection system comprising:
   a deflection pad; and
   a strap coupled to the deflection pad, the strap securing the deflection pad to the torsion beam.

6. The system of claim 5, wherein the deflection pad comprises a leaf spring, the leaf spring formed from a portion of the strap to include a top surface for interfacing with the PV module, the top surface including a first end and a second end, the first end including a first indentation pinching in a first direction toward the second end, and the second end including a second indentation pinching in a second direction toward the first end; and
   a tensile connection wire around a base of the leaf spring and resting in the first indentation and the second indentation.

7. The system of claim 6, wherein the top surface of the leaf spring is covered in a cushioning material.

8. The system of claim 6, wherein a second portion of the strap forms a cable management apparatus, the cable management apparatus including a loop formed by the second portion closing a loop against itself.

9. The system of claim 5, wherein the deflection pad includes a plurality of reinforcing ribs extending away from the deflection pad.

10. The system of claim 9, wherein the reinforcing ribs are formed in a pattern.

11. The system of claim 9, wherein the reinforcing ribs extend away from the deflection pad in a direction towards the torsion beam.

12. The system of claim 9, wherein the reinforcing ribs extend away from the deflection pad in a direction towards the PV module.

* * * * *